United States Patent [19]

Tinkham

[11] Patent Number: 5,534,858
[45] Date of Patent: Jul. 9, 1996

[54] POLETOP SWITCH AUTOMATION SYSTEM

[75] Inventor: Ronald B. Tinkham, Solana Beach, Calif.

[73] Assignee: System Analysis & Integration, Inc., Orange, Calif.

[21] Appl. No.: 182,276

[22] Filed: Jan. 14, 1994

[51] Int. Cl.⁶ .................................................. G08C 19/22
[52] U.S. Cl. ...................... 340/870.07; 340/686; 200/49; 200/82 B
[58] Field of Search ........................ 340/870.07, 870.09, 340/638, 686; 200/48 R, 48 A, 49, 82 A, 82 B

[56] References Cited

U.S. PATENT DOCUMENTS

| | | | |
|---|---|---|---|
| 3,564,179 | 2/1971 | Boersma et al. | 218/51 |
| 3,806,679 | 4/1974 | Pahl | 200/82 B |
| 3,930,134 | 12/1975 | Rostron et al. | 200/82 B |
| 4,128,856 | 12/1978 | MacLeod | 361/156 |
| 4,406,924 | 9/1983 | Dorey | 340/870.02 |
| 4,556,882 | 12/1985 | Brifman et al. | 34 D/638 |
| 5,025,120 | 6/1991 | Jackman | 200/49 |
| 5,206,470 | 4/1993 | Hokutou et al. | 200/82 B |

OTHER PUBLICATIONS

"Metricom Packet Radio Model 220C", Metricom Flyer, Jan. 6, 1992.
"UtiliNet Intelligent Radios", Metricom Flyer, 1993.

Primary Examiner—Brent A. Swarthout
Assistant Examiner—Andrew Hill
Attorney, Agent, or Firm—Knobbe, Martens, Olson & Bear

[57] ABSTRACT

A switch automation system which activates poletop power line switches in response to signals received from a remote location. An actuator piston and cylinder assembly is mounted to a power pole in alignment with existing actuator linkage. The piston and cylinder actuator assembly is translatable in response to pressurized fluid delivered through fluid lines to the cylinder. A control unit also mounted to the power pole, and in operative association with the piston and cylinder actuator assembly, houses a source of pressurized fluid. Manual operation of the poletop switches is retained by an existing operating lever. Adjustment linkage is provided for proper positioning of the actuator assembly with the existing actuator linkage. Operating signals received by the control unit result in activation of solenoids to deliver the pressurized fluid to the cylinder. Simplicity of design and linear alignment with the existing actuator linkage allow for easy installation and operation.

28 Claims, 13 Drawing Sheets

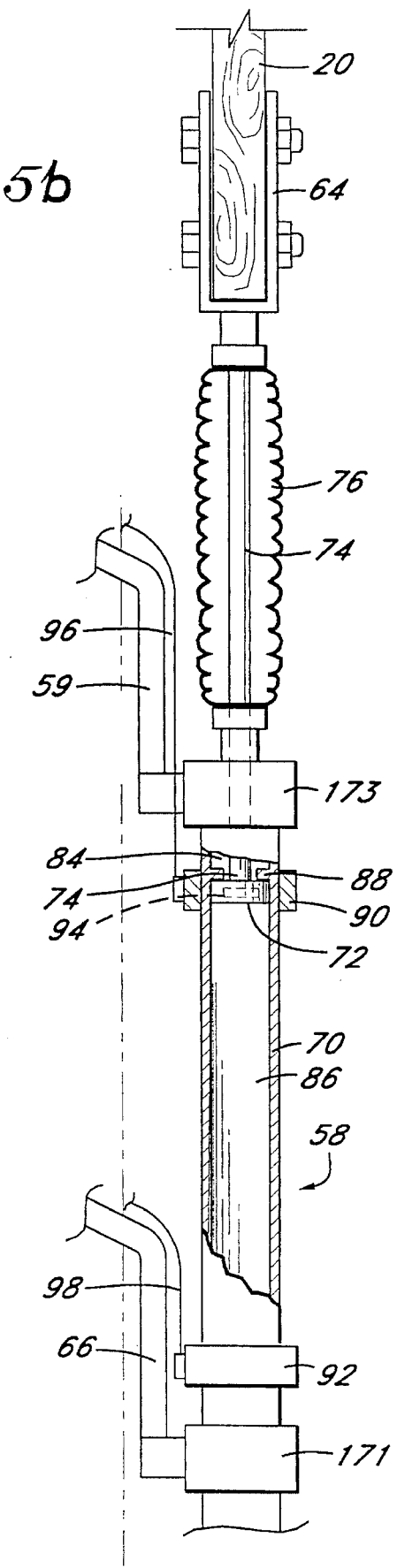

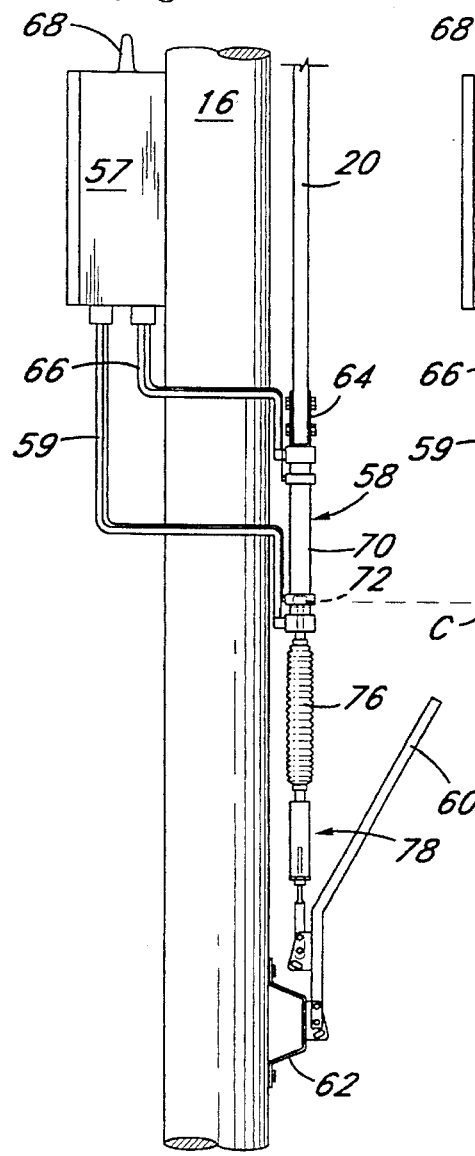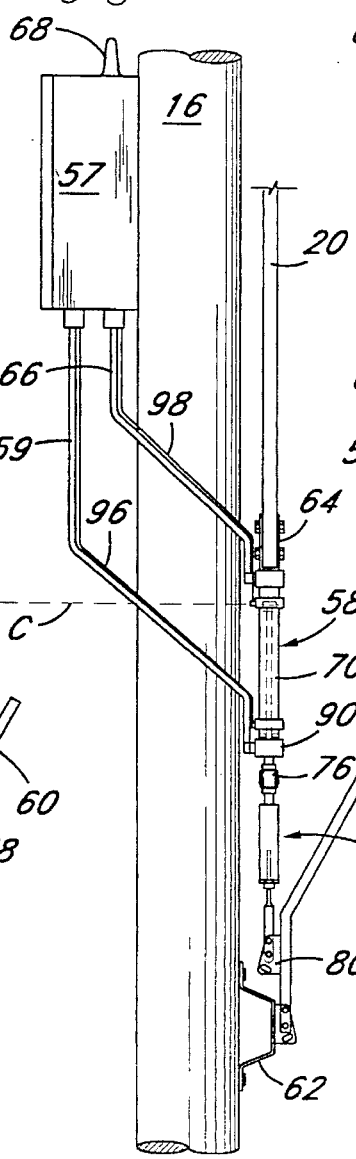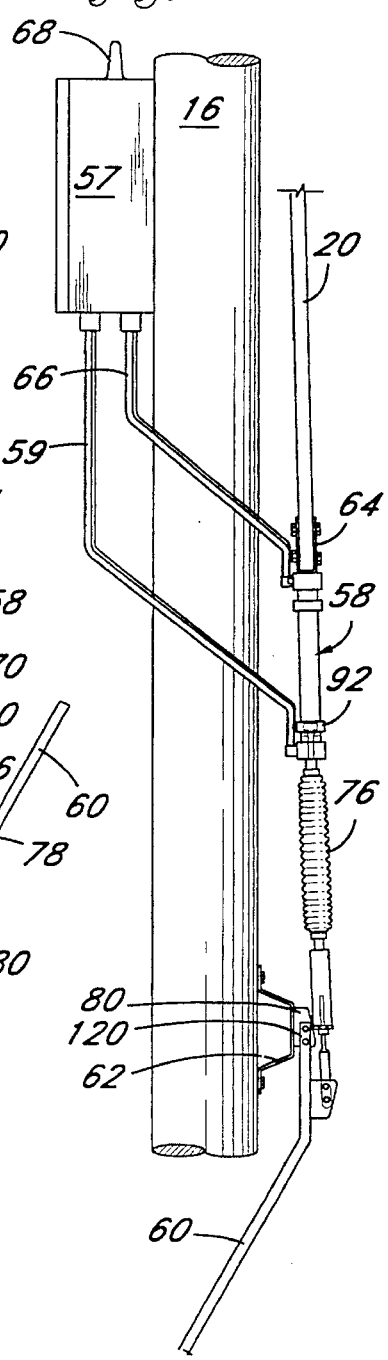

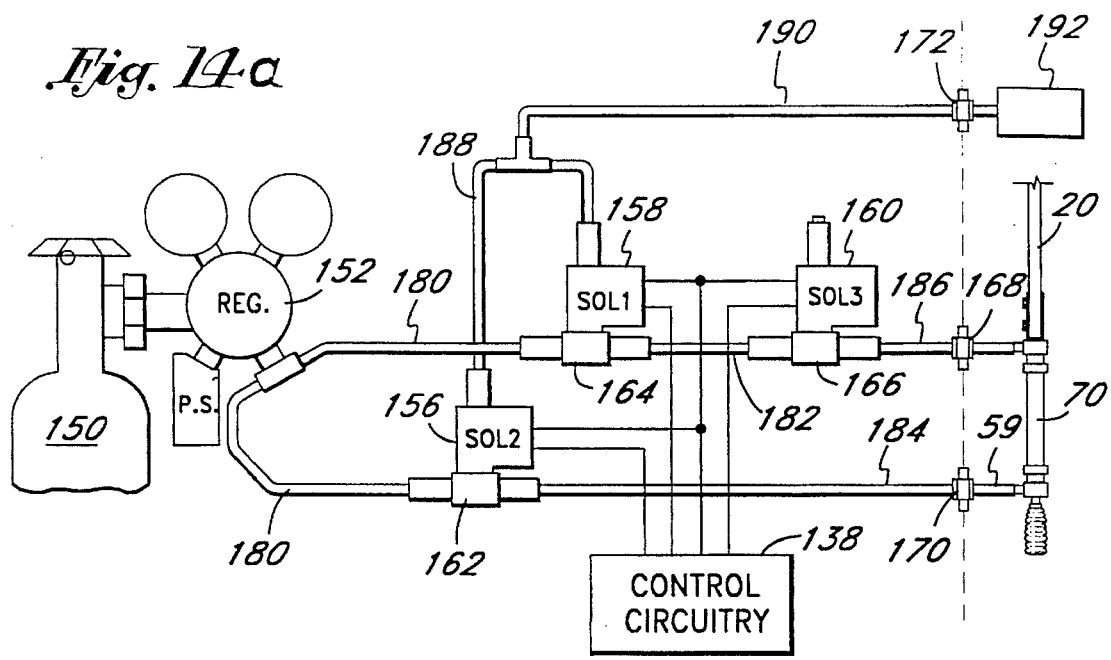
Fig. 14-a
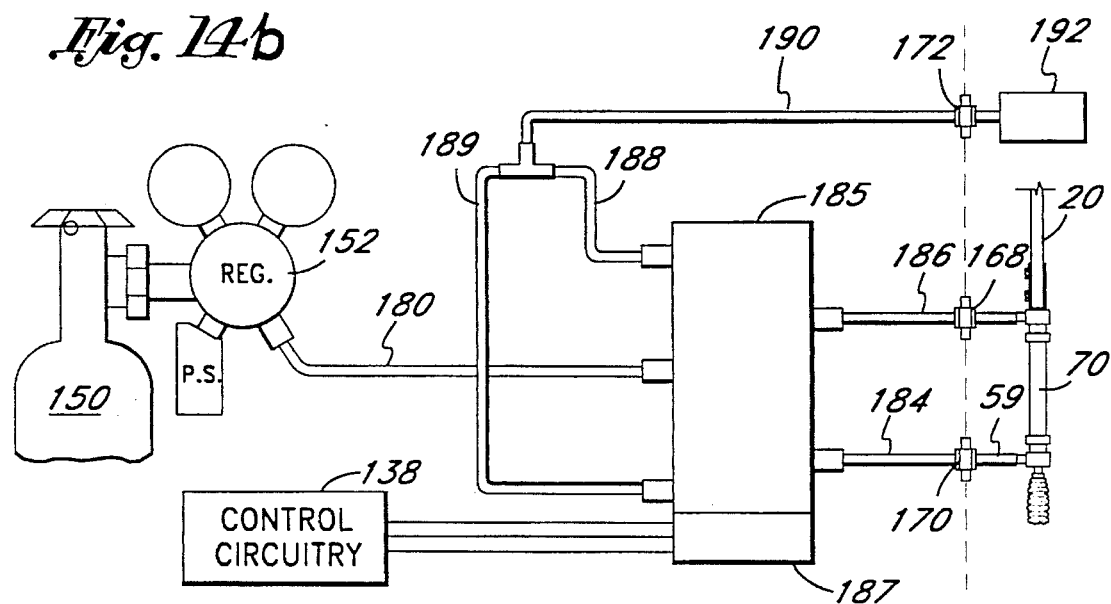
Fig. 14-b
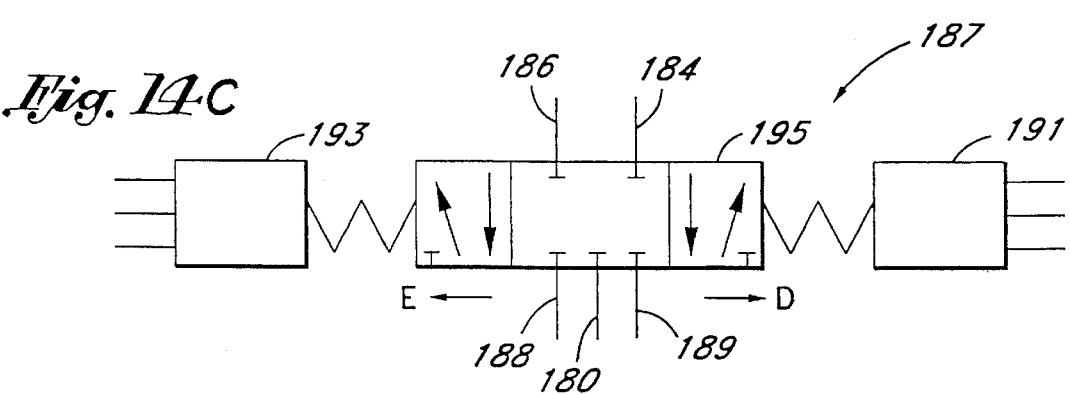
Fig. 14-c

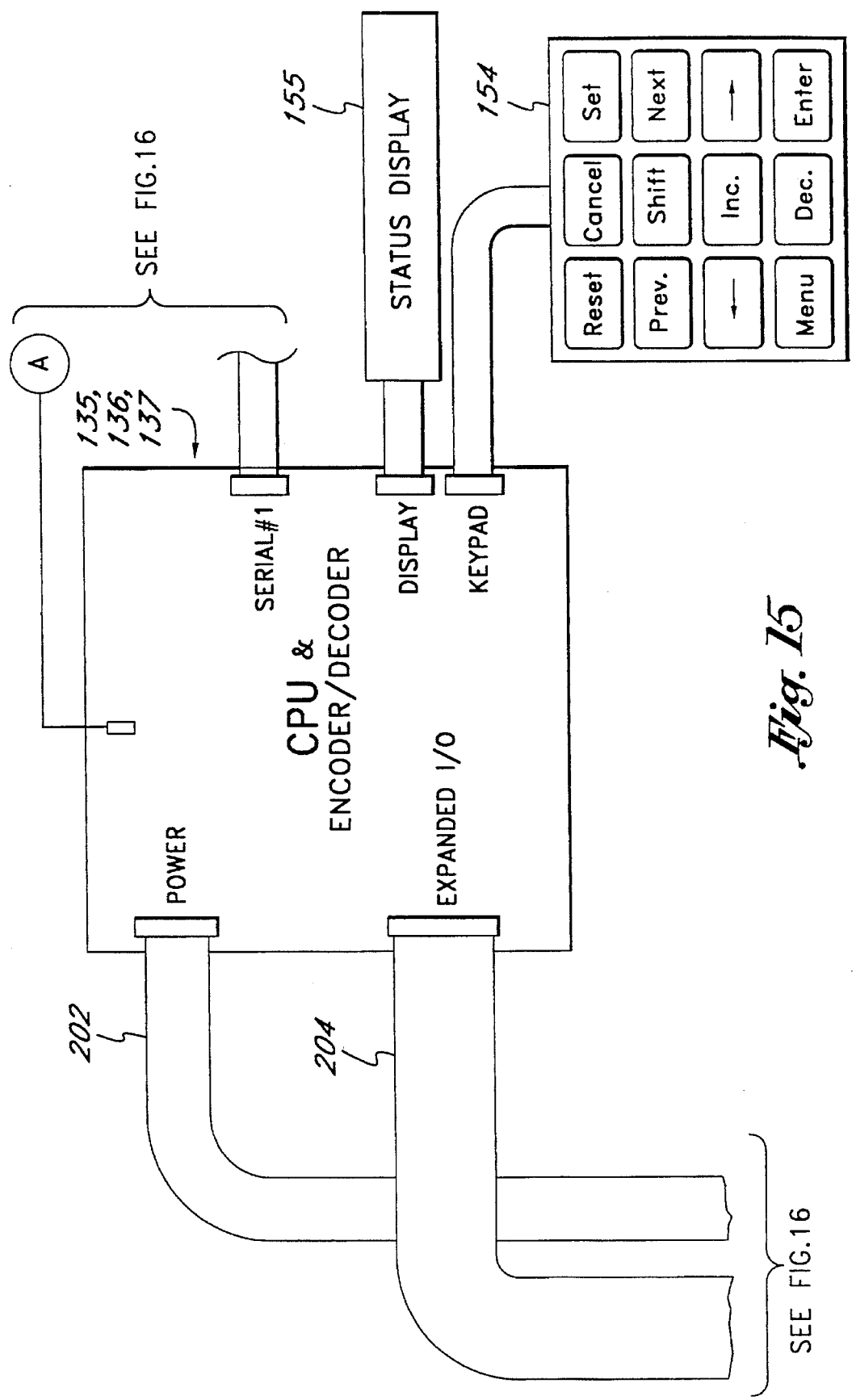

POLETOP SWITCH AUTOMATION SYSTEM

BACKGROUND OF THE INVENTION

This invention pertains to the field of electrical power distribution networks, and in particular to poletop switches, which control the flow of electricity, and are mounted on electric power poles. More particularly, this invention pertains to remotely operated devices used to open and close the high voltage switches found on electric power poles.

Most commercial and residential power is distributed through electric cables which are run along a series of power poles. The power is distributed through three separate cables each of which transmits power in a different phase. These poles are mounted with a gang of high voltage electric power switches enabling the flow of electricity to be stopped when the switch is open. Poles with these ganged switches are placed strategically around a city or countryside to allow the flow of power to be diverted from a given area and rerouted to another area.

Power distribution switches are often open and closed routinely to redistribute power in response to load increases and decreases from a particular area. In some cases, the power switches must be operated in response to an unexpected power loss, or other emergency. In cases when the switches must be opened or closed, and where remotely operated switches are not in place, a crew must be dispatched to the exact location of the pole having the ganged poletop switches. The crew then operates the switches manually to open and close them as needed. Sending a crew to manually "throw" a set of ganged switches can be costly to the company responsible for power distribution. In addition, because some of the poletop switches may be located in distant areas, it may take considerable time for the crew to travel to the affected location which impacts the households or plants using the power.

To combat these problems, there have been some attempts to use mechanical actuators to open and close power switches One such device is shown in U.S. Pat. No. 3,806,679 issued to Pahl. Pahl discloses a hydraulic switch actuator which can be mounted near the bottom of a power pole to operate power line switches. The Pahl actuator includes a self-contained hydraulic cylinder and piston assembly which is attached to a crank arm that provides the movement necessary to open and close the switches. Operation of the actuator in Pahl can be performed by an operating button located near the actuator, or by remote radio signals received by the actuator.

Another mechanical actuator device is disclosed in U.S. Pat. No. 3,930,134 issued to Rostron, et al. The actuator in Rostron provides translatable movement through the use of a pneumatic piston and cylinder assembly which uses high pressure gas to generate movement of the piston. The Rostron device employs an operating rod and lever assembly to provide the actuation needed to open and close a power switch.

The prior art fails to adequately solve the problems associated with performing manual switching operations of high voltage power lines. In particular, the Pahl and Rostron patents both disclose actuators for providing controlled translatable movement which in turn operates a set of switches. However, these prior art designs are cumbersome and contain complex mechanical linkage assemblies.

SUMMARY OF THE INVENTION

None of the prior art references discloses a relatively simple and cost efficient apparatus for obtaining remote control over high voltage poletop switches. Nor do the references disclose a mechanical system which can be easily installed in an existing manually operated gang of switches. In addition, none of the disclosed automated mechanisms allows a dispatched crew to easily and manually override the poletop switch mechanisms should the mechanisms fail.

Accordingly, the present invention solves the deficiencies found in existing prior art systems. In particular, it is an object of the present invention to provide a relatively simple mechanical device for remotely operating a set of ganged switches attached to a power pole. The present invention avoids the need for complex, difficult-to-maintain, and expensive mechanical devices to perform the necessary repeatable movement associated with the opening and closing of poletop switches. The present invention also solves the problem of having to choose between an efficient remotely operated switch which may fail, and a manually operated switch which has guaranteed reliability.

In accordance with the present invention, and disclosed herein, is an improved device for providing operational control of a set of high voltage power switches mounted to a pole top. The device consists primarily of a piston and cylinder assembly and a control unit. The piston and cylinder assembly may be either hydraulically or pneumatically operated, but the preferred embodiment operates pneumatically.

The piston and cylinder assembly is easily mounted to an existing electric power pole to provide translatable movement in response to pressure variations within the cylinder. The control unit receives remote radio signals from a control center and energizes appropriate electric gas valves, depending on the signals, to direct the flow of gas into the piston and cylinder assembly. Alternatively, the control unit may receive signals by other methods such as a modem operating on standard telephone lines.

High voltage power switches that are grouped together in sets of three are typically operated simultaneously by movement of a linkage rod. The linkage rod runs parallel to the vertical length of the power pole and extends from the top, where the switches are mounted, to the bottom of the pole where the poletop switch automation system is mounted.

In accordance with a preferred embodiment of the present invention, the piston and cylinder assembly is mounted near the bottom of the pole so that the assembly and the linkage rod are linearly aligned. The rod is connected to the top of the piston and cylinder assembly and moves up and down in direct response to movement of the assembly. This allows for simple operational control of the poletop switches. The control unit is also mounted near the bottom of the power pole but at a separate location than that of the piston and cylinder assembly.

The piston and cylinder assembly is connected to the control unit through a pair of fluid lines. These lines provide pressurized gas to chambers within the cylinder located on opposite sides of the piston. Translatable movement results from forces acting on the piston and cylinder walls created from the high pressure gas. The direction of movement depends on what chamber the flow of gas is directed to.

Sensors mounted on respective ends of the cylinder determine the location of the piston relative to the sensors. This information is fed back to the control unit, and may be transmitted over the airwaves, to monitor the position of the cylinder and accordingly the status of the switches. An adjustment bracket is also mounted co-linearly with the linkage rod and piston/cylinder assembly to allow for fine tuning the position of the device. This allows the sensors to provide accurate information regarding the state of the switches.

The present invention is adaptable for use with an existing operating lever found on power poles which have manually operated poletop switches. In this situation, the lever retains its functionality and is mechanically connected to the piston and cylinder assembly. The lever can be used to open the set of switches manually, if needed, providing the assurance that control of the switches will not be lost upon failure of the pneumatic device.

BRIEF DESCRIPTION OF THE DRAWINGS

FIG. 3a is a side view of a set of ganged high voltage power switches mounted to a power pole and operatively connected with the present invention.

FIG. 3b is a frontal view of the power pole and poletop switches depicted in FIG. 3a.

FIG. 5b is a close up view of an alternative embodiment of the piston and cylinder assembly.

FIG. 7 is an operational view of a preferred embodiment of the present invention with the piston and cylinder assembly shown in the closed-switch position.

FIG. 8 is an operational view of a preferred embodiment of the present invention with the piston and cylinder assembly shown in the open-switch position.

FIG. 9 is an operational view of a preferred embodiment of the present invention with the piston and cylinder assembly shown in the closed-switch position, but with the manual lever in the open-switch position.

FIG. 14a is a schematic view of a preferred embodiment of the pressurized gas system and its associated control circuitry to effectuate movement of the air cylinder.

FIG. 14b is a schematic view of an alternative embodiment of the pressurized gas system and its associated control circuitry to effectuate movement of the air cylinder.

FIG. 14c is a schematic illustration of the solenoid shown in FIG. 14b which is used to control the flow of pressurized gas in an alternative embodiment.

FIGS. 15 and 16 depict a detailed layout of the internal components found in the control unit.

DETAILED DESCRIPTION OF THE PREFERRED EMBODIMENTS

Figure 1:
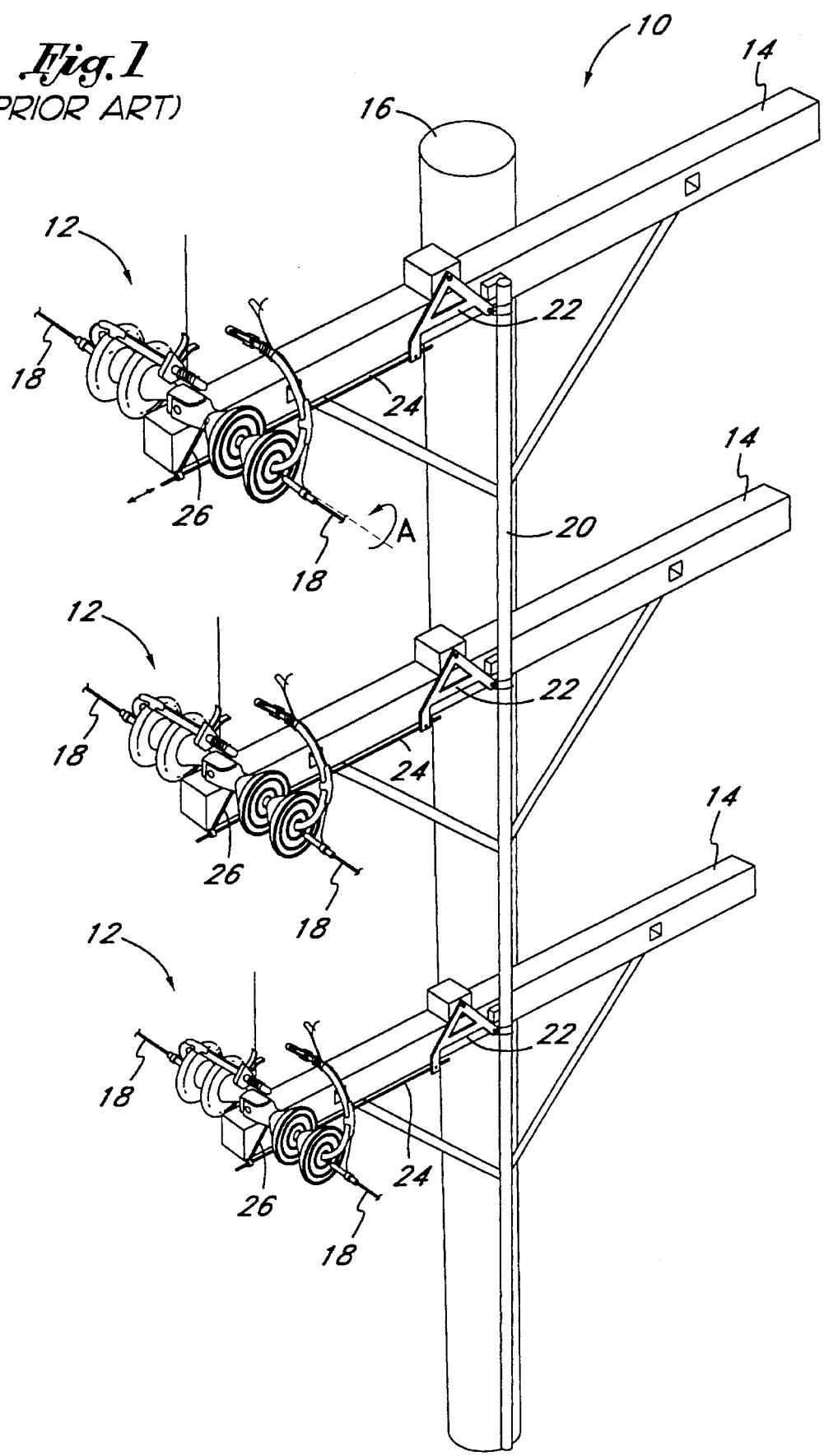
FIG. 1 is a perspective view of a set of ganged poletop power switches mounted to the top of a power pole.

Referring now to FIG. 1 there is illustrated a common high-voltage electric power pole 10 containing three poletop switches 12 mounted on horizontal support members 14. The horizontal support members 14 are attached near the top of the shaft 16 of the electric power pole 10. As is common in most power distribution systems, each horizontal support member 14 has attached thereto an electric power line 18, which is strung between a succession of electric power poles. At selected points along a power distribution system, some electric power poles are fitted with the poletop switches like those shown in FIG. 1. These switches allow power to be distributed into or out of selected areas in response to increased power demands or in response to emergency situations.

As can be seen in FIG. 1, the three switches 12 are ganged together through mechanical linkage which typically consists of a wooden or fiberglass rod 20 running parallel to the shaft 16 from the top of the shaft to the bottom where the poletop switch automation system is mounted. The rod 20 is connected at three locations to a set of pivoting brackets 22, which translate vertical movement by the rod 20 into lateral movement. Each bracket 22 is mounted to a respective support member 14 and connected to associated linkage 24. The lateral movement by linkage 24 is then translated into rotational movement through a shorter piece of linkage 26, allowing the poletop switch 12 to open and close as it rotates about the axis labelled A.

Figure 2:
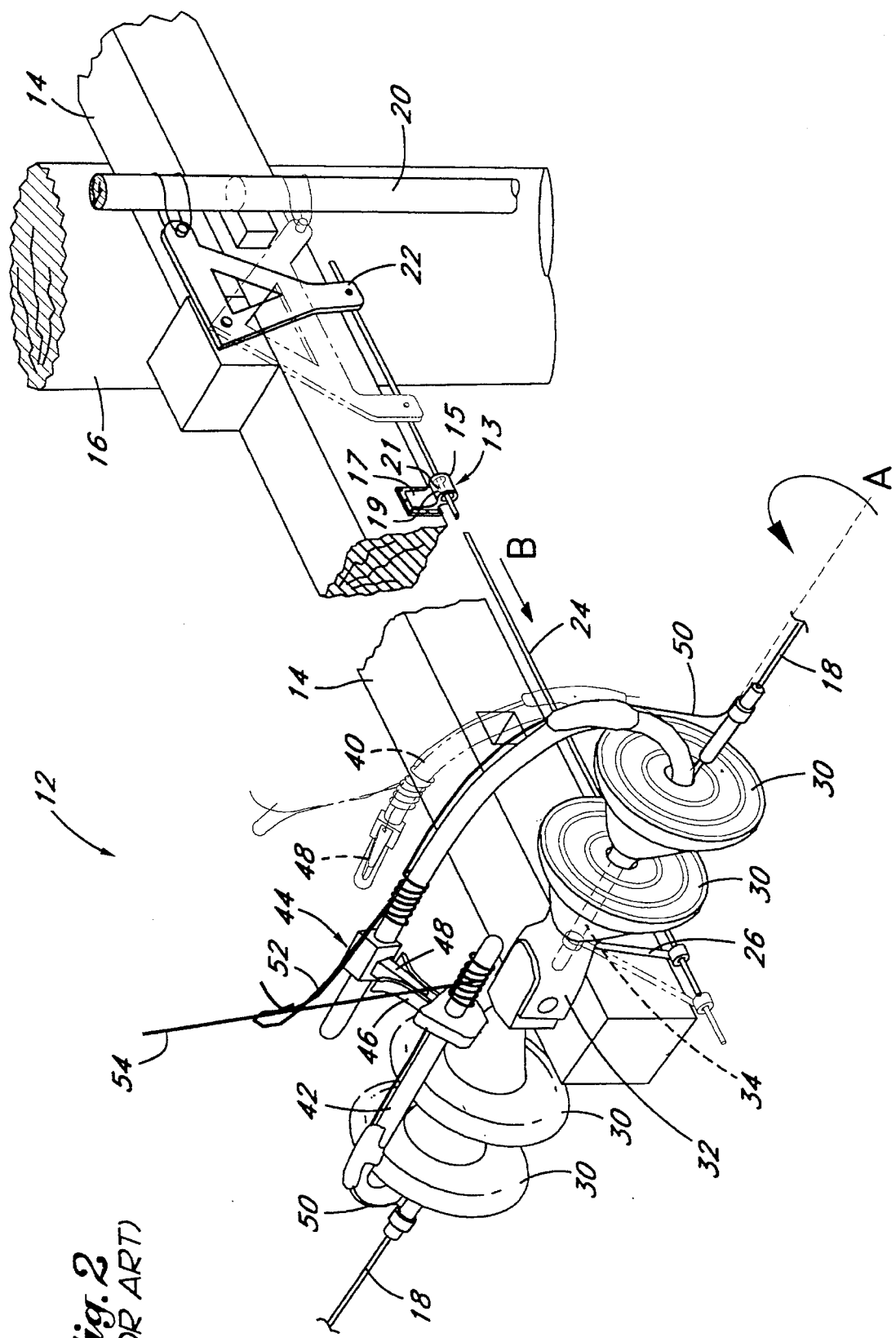
FIG. 2 is a close-up view of a single poletop switch and associated linkage shown in the closed position and also shown, in phantom, in the open position.

The operation of the poletop switch 12 can best be described in conjunction with FIG. 2. As can be seen, the poletop switch 12 of FIG. 2 is formed as two conducting members 40 and 42 which reroute power around the support member 14 and through an electrical connector 44. The electric power cable 18 is attached at opposite ends of the switch to respective conducting members 40 and 42 as shown. A set of insulators 30 is attached between one end of each conducting member 40 and 42 and the support member 14 as shown in FIG. 2. The insulators 30 shield the electric power cable from the horizontal member 14 and the associated linkage 24 and 26. The insulators 30 are attached to the member 14 through a mounting bracket 32 and associated rotatable rod 34.

The conducting members 40 and 42 meet at a point away from the insulators where there is formed a high-voltage electrical connector generally designated 44. This connector 44 is used to interrupt the transfer of power as the members are separated. The connector 44 contains a female portion 46 attached to member 42 and a male portion 48 attached to the member 40. The members 40 and 42 are electrically connected to the power line 18 at their respective ends near the insulators 30. When a lateral movement is displaced along the linkage 24 in the direction shown by the arrow B to the position shown in phantom, it can be appreciated that the rod 34 will rotate. Rotation of the rod 34 in turn causes rotation of the switch member 40 to the position shown in phantom, thereby disconnecting male contact portion 48 from female contact portion 46. This opens the electrical connector 44 attached to switch members 40 and 42.

A stiff electrical conducting wire 50 is connected between respective ends of the electric power cable 18 and strung along conducting members 40 and 42. The wire 50 is formed into a loop 52 near the end of the member 40. Near the end of member 42, the wire 50 is drawn upwardly into a taut portion 54 as shown in FIG. 2. When the poletop switch 12 is urged toward the closed position, loop 52 contacts section 54 before the poletop switch 12 is actually closed. This creates the preliminary arc associated with the initial flow of current at the point where loop 52 meets wire section 54. Once the switch is closed, most of the current will be flowing through the contact portions 46 and 48. This keeps the preliminary arc away from the connector 44, thereby avoiding corrosion and possible failure of the connector 44.

Also shown in FIG. 2 is a latching mechanism 13 mounted to the horizontal support member 14. The latching mechanism 13 is intended to hold the switch 12 in the closed position against the forces of gravity acting on the linkage rod 20 and components of the poletop switch automation system. Normally, the poletop switch automation system will maintain the switch 12 in the closed position. However, if the system should fail it is possible, though unlikely, that the force of gravity will open the switch. To prevent this possibility, the latching mechanism 13 is used.

The latching mechanism 13 may be constructed in accordance with any number of methods well known in the art. The latching mechanism shown in FIG. 2 consists of a sleeve 15 attached to a stiff, yet flexible support member 17. The support member 17 is attached to the horizontal support member 14. The interior of the sleeve has a notched portion 19 which mates with an associated detent 21 that is placed on the linkage member 24. When the switch 12 is in the closed-circuit position, the detent 21 aligns with the notch 19 to provide an added degree of friction preventing movement of the linkage member 24 from gravity acting on the rod 20 and other vertically moveable components.

Other latching mechanism devices which may be used in place of the mechanism 13 include an over-center mechanism or a spring loaded gate device. These devices all perform the same function of tending to maintain the switch in the closed position. In addition, some of these devices also work when the switch is in the open position. Specifically, an over-center mechanism used with the rod 24 will initially resist any change in movement of the rod regardless of the static position of the rod. Once a certain force is applied by the rod 24, the over-center mechanism would release the rod.

Use of a latching mechanism 13 avoids the need to maintain the cylinder at a pressurized level to keep the switches closed. This is advantageous because a pressurized cylinder may leak slightly causing the source of gas to be depleted.

Figures 3A, 3B:
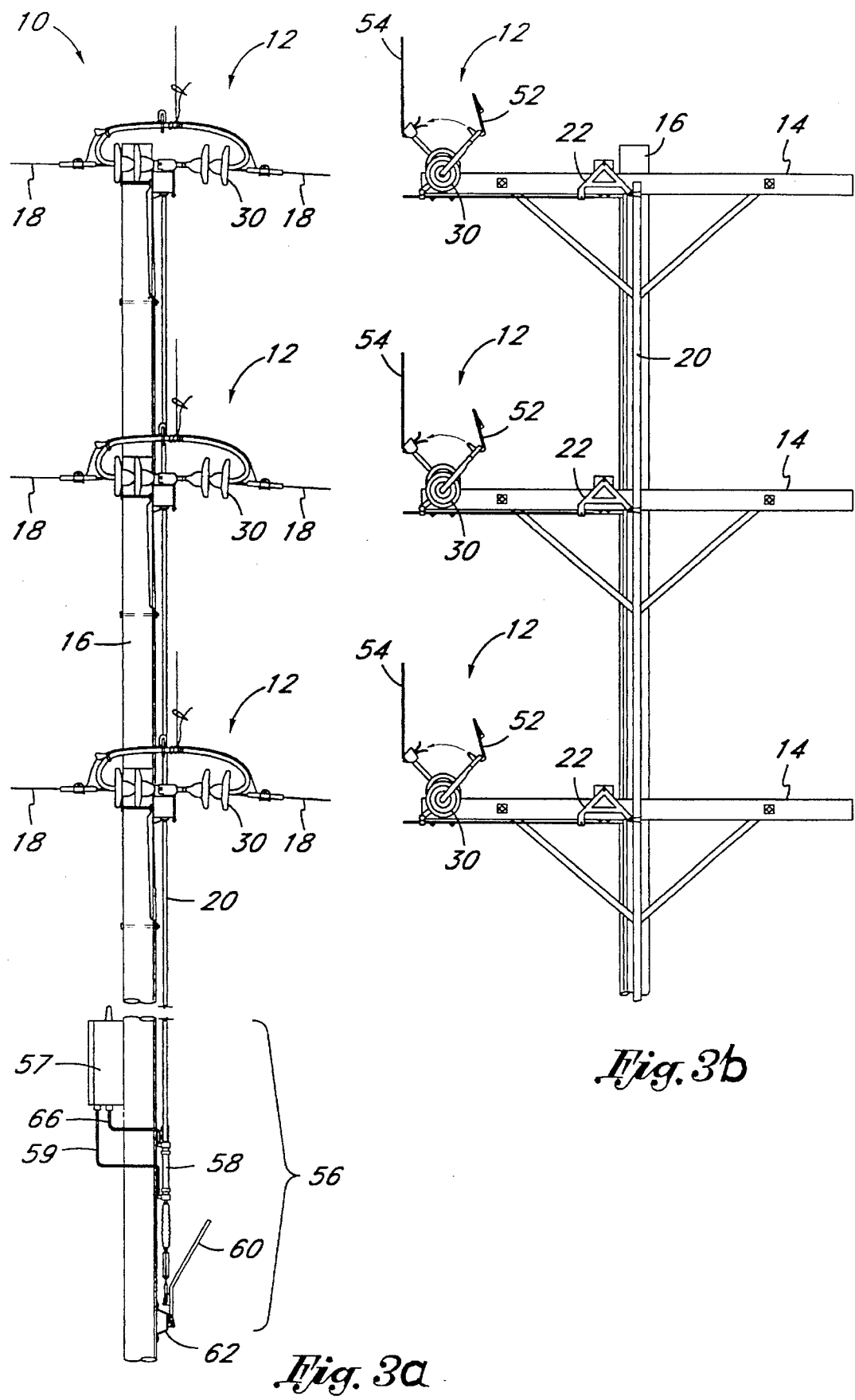

FIG. 3a shows an electric power pole with a set of ganged poletop switches 12 in operative association with the poletop switch actuator assembly 56. The view shown in FIG. 3a is a side view, with the power cables running horizontally from left to right. FIG. 3b depicts the top portion of the power pole of FIG. 3a rotated 90 degrees to clearly show the operation of the three ganged switches 12.

Referring now to FIG. 3a, the rod 20 runs the length of the shaft 16 where it is connected to the poletop switch assembly 56 near the bottom of the shaft. A preferred embodiment of the actuator assembly 56 includes of a control unit 57, which is connected to the piston and cylinder assembly 58 through a pair of air lines 59 and 66. The piston and cylinder assembly 58 is then operatively connected to a lever 60, which is advantageously mounted to the shaft 16 by a mounting bracket 62.

Figure 4:
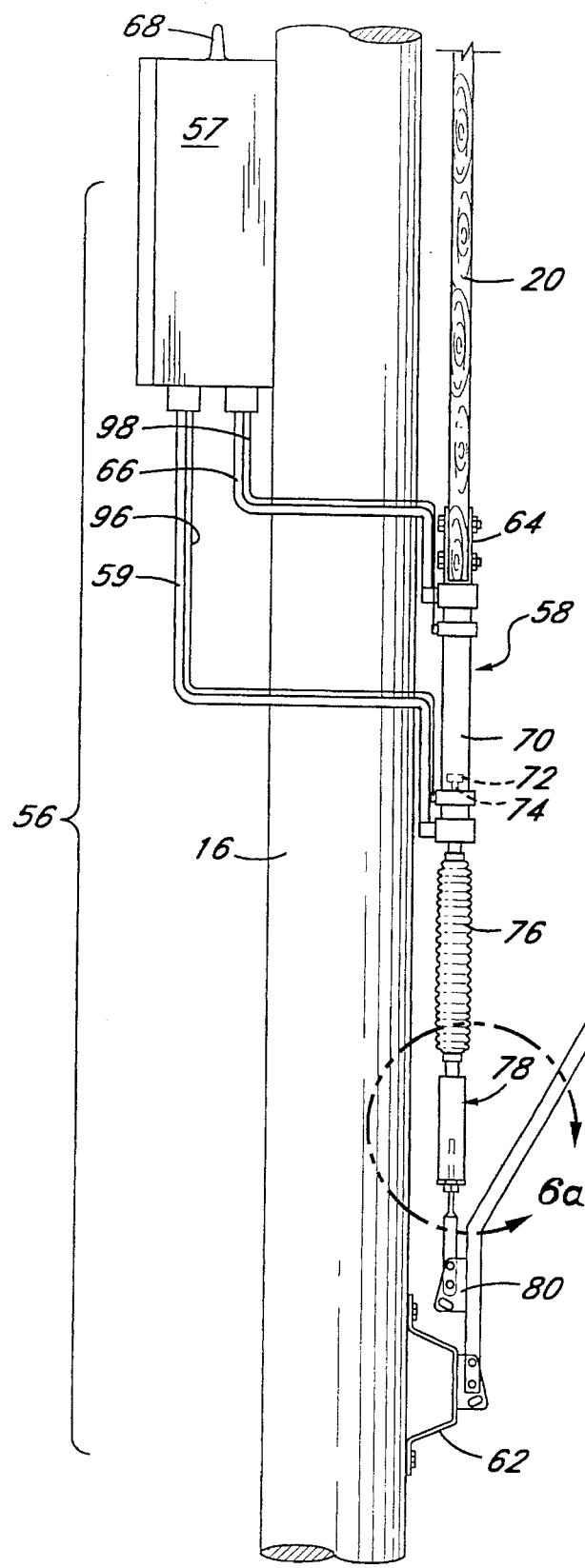
FIG. 4 is a side operational view of a preferred embodiment of the poletop switch automation system.

The preferred embodiment can be seen in more detail in conjunction with FIG. 4. In FIG. 4 the actuator assembly 56 is shown operatively connected to the rod 20 by a bracket 64. The bracket 64 is attached to the piston and cylinder assembly 58 and moves in association therewith. The piston and cylinder assembly 58 is a pneumatically driven system, which receives pressurized air through the air lines 59 and 66. The piston and cylinder assembly 58 is composed of a pneumatic cylinder 70 and a piston 72. Attached to the piston 72 is a connecting rod 74, which extends downwardly out of the cylinder 70 and is eventually connected to an adjustment linkage 78. A protective rubber boot 76 surrounds the connecting rod 74 between the end of the cylinder 70 and the top of the adjustment linkage 78. The protective boot keeps the connecting rod clean and free from damage. The lower end of the adjustment linkage 78 is pivotally connected to a bracket 80 mounted near one end of the lever 60. The lever 60 is also pivotally mounted at the same end to a mounting bracket 62, which is connected to the power pole shaft 16.

As can be readily seen from FIG. 4, the piston and cylinder assembly 58 and associated adjustment linkage 78 are designed to be linearly aligned. Likewise, the assembly 58 and adjustment linkage 78 are attached to the power pole in a configuration that is linearly aligned with the rod 20. This reduces the need for any complex mechanical linkage or other redirection of the translatable movement generated by the piston and cylinder assembly 58. Rather, the movement of the rod 20 will be in a direct one-to-one relationship with the movement generated by the piston and cylinder assembly 58. This allows for easy operational control of the ganged poletop switches 12 with a simple and low cost mechanical device.

Some existing power line poletop switches can only be operated manually by moving a lever like the one shown in FIG. 4. In these systems, the lever will be directly connected to the rod which extends upwardly to the top of the pole. Poletop switches which can only be operated manually may be retrofitted with a preferred embodiment of the present invention by substituting the preferred embodiment for a portion of the rod 20. This leads to the configuration shown in FIG. 4.

The piston and cylinder assembly 58 responds to pressurized air delivered from lines 59 and 66 and through flow control units 171 and 173. The preferred flow control units 171 and 173 are Bimba model number FCP4. The delivery of air through the lines 59 and 66 is monitored and controlled by a control unit 57. The control unit 57 is also mounted to the shaft 16 at a separate location as shown in FIG. 4. Operation of a preferred embodiment of the piston and cylinder assembly 58 can best be described in conjunction with FIG. 5a.

Figure 5A:
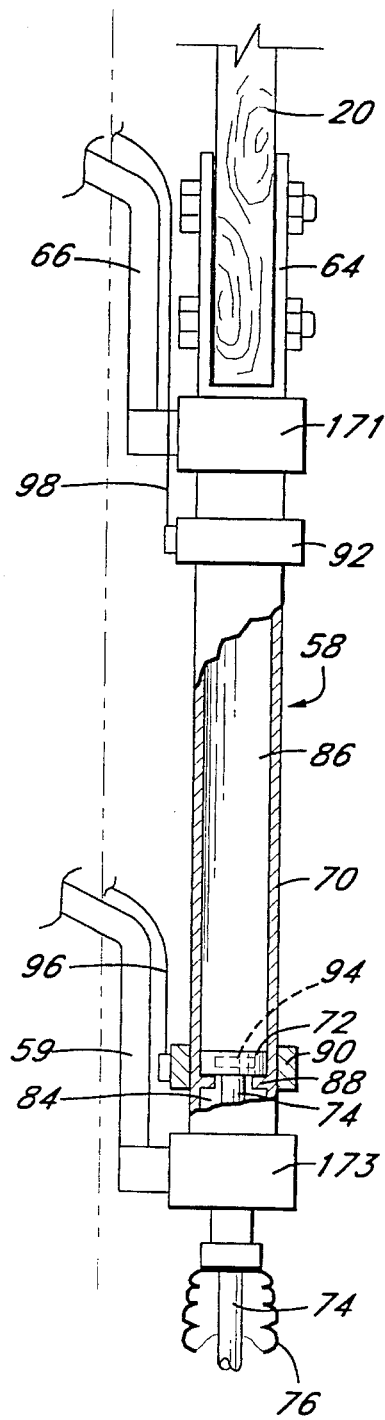
FIG. 5a is a close up view of a preferred embodiment of the piston and cylinder assembly.

FIG. 5a depicts a close-up cutaway view of the piston and cylinder assembly 58. The piston 72 is shown in its operative association with the cylinder 70. The interior of the cylinder 70 contains two gas chambers 84 and 86, located on respective sides of the piston 72. These chambers 84 and 86 contain pressurized gas delivered by gas lines 59 and 66, respectively. Because the cylinder 70 is connected to the rod 20 through bracket 64, the cylinder in this embodiment moves to provide the translation needed to open the set of ganged poletop switches 12.

Whichever end of the cylinder 70 receives pressurized air determines the direction of movement of the cylinder 70, and correspondingly the direction of movement of the rod 20.

In the position shown in FIG. 5a, the upper chamber 86 of the cylinder 70 is filled with pressurized air forcing the expansion of the chamber as the cylinder 70 moves upwardly. FIG. 5a shows the cylinder at its highest range of motion. This range of motion is limited by protrusions 88 which are advantageously attached to the interior wall of the cylinder 70. These protrusions 88 may be individual tabs or they may be formed as a circular ring placed in the cylinder 70. The protrusions 88 contact the underside of the piston 72 to prevent further movement by the cylinder 70. The normal operating position of the cylinder 70 is that shown in FIG. 5a, where the rod 20 has been urged upwardly to close the ganged poletop switches 12 (as shown in FIG. 2).

The amount of force required to move a set of poletop switches between the open and closed positions varies upon the application but it can reach a level of 500 pounds. As such, the bore of the cylinder is approximately two and one-half (2.5) inches in diameter providing a piston surface area of approximately five (5) square inches. A typical cycling of the cylinder position, in a situation where 500 pounds of force is needed, will therefore require approximately 100 pounds per square inch of pressure delivered from a source of pressurized gas. The actual force needed to cycle the switch may be considerably less than 500 pounds. In these situations, the cylinder will begin to move as soon as the force from the pressurized air within the cylinder is greater than that needed to move the switches. Thus, there will not be any excess or wasted pressurized gas sent to the cylinder. Optimally, it is desired to use a source of pressurized gas that will allow a minimum of fifty (50) complete cycles before replacing the source of gas.

Sensors 90 and 92 are provided to detect the position of the cylinder relative to the piston. This correspondingly provides information about the position of the poletop switches 12. Sensors 90 and 92 are magnetic detection sensors that respond to a permanent magnetic material 94 attached to the piston 72. The Bimba model number MRS-.087- XBL-50 sensor is used in a preferred embodiment of the present invention. As is well known in the art relating to sensors, when the magnetic material 94 approaches one of the sensors 90 and 92, an electrical current is transmitted through a respective wire 96 or 98 back to the control box 57. This allows the control box to monitor the position of the cylinder and adjust the flow of pressurized air accordingly.

FIG. 5a also more clearly shows the connecting rod 74 attached to piston 72. This rod 74 extends downwardly out of the cylinder 70 where it is covered by a protective and deformable boot 76. After exiting the protective boot 76, the rod 74 is attached to the adjustment linkage 78 (shown in FIG. 4).

FIG. 5b shows an alternative embodiment of the actuator assembly whereby the position of the piston and cylinder assembly are reversed. As shown in FIG. 5b, the connecting rod 74 is directly attached to the rod 20 by the bracket 64. The connecting rod 74 extends downward from the rod 20 and is covered by the protective boot 74 before entering the cylinder 70. The piston 72 is attached to the connecting rod 74 inside the cylinder 70 and at an opposite end from the bracket 64. The cylinder is in turn connected at its lower end to the adjustment linkage 78. It can be appreciated that in the alternative embodiment of FIG. 5b, the piston 72 will move in response to the delivery of pressurized air to the cylinder 70. Because the cylinder 70 is now stationary, when pressurized gas is delivered to chamber 86, the piston 72 and the rod 20 will be urged upwardly. Conversely, when pressurized gas is delivered to chamber 84, the piston and the rod 20 will be urged downwardly. In this alternative embodiment, there are less moving parts because the gas and electrical sensing lines will no longer move when the actuator is activated.

Figure 6:
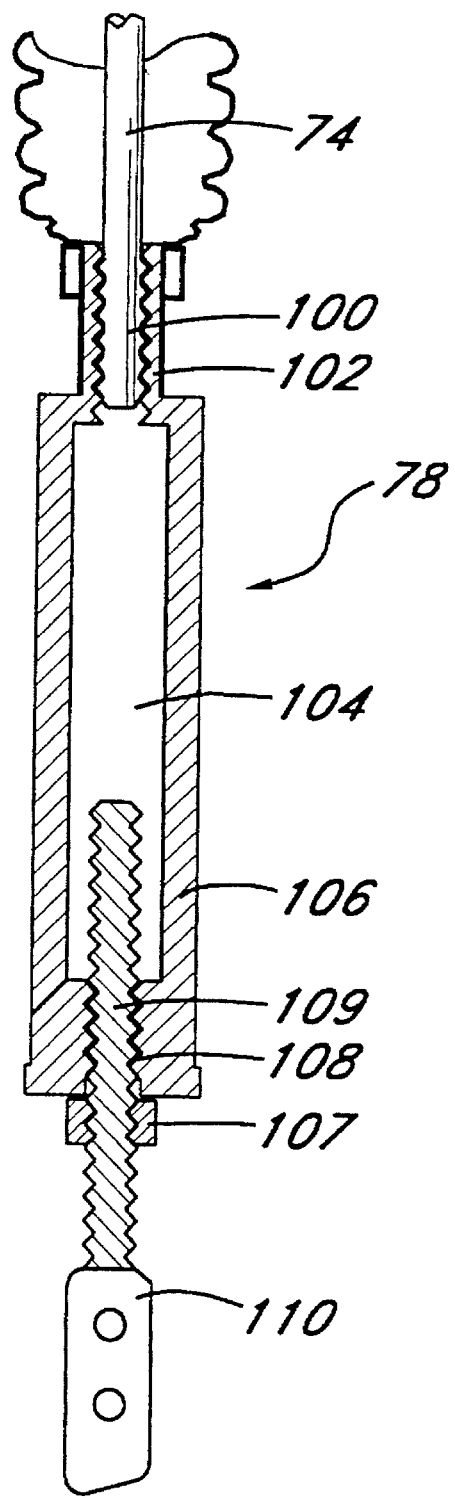
FIG. 6 is a close up view of a preferred embodiment of the adjustment linkage of the present invention shown enclosed by the dashed semi-circle in FIG. 4.

A close-up view of the adjustment linkage 78, shown enclosed by the dashed semi-circle of FIG. 4, is depicted in FIG. 6. FIG. 6 shows the connecting rod 74 exiting the protective boot 76 and attached to the top portion of the adjustment linkage 78. The end of the connecting rod 74 includes a threaded portion 100 which engages the internal threads 102 of an adjustment cylinder 106. The adjustment cylinder 102 has a bore 104 running through the center of the entire adjustment cylinder 106 as shown.

The lower end of the adjustment cylinder 106 also has internal threads 108 which mate with a threaded portion 112 of a linkage rod 110. A jamming nut 107 is threadably engaged with threaded portion 108 before the threaded portion 108 is inserted into the adjustment cylinder 106.

To adjust the height of the adjustment linkage 78, and correspondingly the height of the entire actuator assembly, the jamming nut is first loosened from its position shown in FIG. 6. Then, the linkage rod 110 is removed from the lever bracket 80 (not shown) so the linkage rod 110 can be rotated. This rotation of the linkage rod 110 raises or lowers the adjustment linkage 78 depending on the direction of rotation. When the desired height is reached, the linkage rod 110 is again attached to the bracket 80 and the jamming nut is tightened against the adjustment cylinder 106. This adjustment is necessary during installation and maintenance to ensure that the sensors operate as intended by giving accurate readouts of the pneumatic cylinder position which in turn provides an accurate status of the poletop switches 12.

FIGS. 7, 8, and 9 depict various positions of the preferred embodiment obtained during both normal automatic operation, and during manual operation. The poletop switch automation system operates by transmitting radio signal commands from a central control center (not shown) which are then received by an antenna 68 attached to the control unit 57. The radio signal commands instruct the control unit 57 to apply pressurized gas through the appropriate air line, either air line 59 or air line 66.

FIG. 7 depicts the poletop switch automation system in the same position as shown in FIG. 4, with the cylinder 70 extended fully upward. The cylinder 70 is attached to a bracket 64 which is in turn connected to the rod 20. The rod 20 extends upward to the set of pivoting brackets 22 for operation of the poletop switches 12 in the manner described in FIG. 2. With the cylinder in this position, the poletop switches 12 will be in the closed position. In the preferred embodiment, the piston 72 will be mounted in a stationary position as shown in FIG. 7, however the piston 72 can be moved slightly in response to rotation of the adjustment linkage 78.

FIG. 8 depicts the present invention in the open circuit, or open switch, state. In this position, the cylinder 70 has been extended to its furthest downward position. Because the piston and cylinder assembly is linearly aligned with the rod 20, the translatable movement of the cylinder 70 causes an equal translation of the rod 20. In the position shown in FIG. 8, the movement of the rod 20 has caused the poletop switches 12 to open in the manner described and shown in conjunction with FIGS. 1 and 2. In this position, movement of the cylinder causes the protective boot 76 to be deformed and compressed. The associated air lines 59 and 66 and the sensor wires 96 and 98 must be flexible and contain sufficient slack to accommodate the movement of the cylinder 70. However, the lines must be kept relatively short to reduce the amount of air that is exhausted during operation of the poletop switch automation system.

When the cylinder is in the open switch position, the piston 72 will be proximate to the top sensor 92 of the cylinder 70. The sensor 92 provides an electronic signal through wire 98 when the cylinder has reached its full range of motion so that the flow of air to chamber 84 can be halted. In both FIGS. 7 and 8, the lever 60 remains in the upward position. Likewise, the piston 72 remains at the same vertical position, shown by the dashed line C, throughout the movement of the cylinder associated with FIGS. 7 and 8. In fact, the piston will only move in the vertical direction in response to a change in the adjustment linkage 78 or in response to movement of the manual lever 60.

FIG. 9 shows a third position of the poletop switch automation system in which the manual operating lever 60 has been employed to override the position of the cylinder 70 dictated by the control unit 57. The position shown in FIG. 9 results when the manual lever 60 is rotated while the poletop switch automation system is in the normally closed-switch position of FIG. 7. In the position shown in FIG. 7, it is possible that the pneumatic piston and cylinder assembly 58 will not function as intended. For this reason, it is desirable to have the capability to manually open the switches 12 if necessary. The present invention affords this possibility through use of the manual operating lever 60.

Manual operation of the lever 60 causes it to rotate about its pivot point 120, which is also the point of attachment to the bracket 62. During such rotation the entire piston and cylinder assembly 58 is pulled downwardly from the position shown in FIG. 7. The piston will urge the cylinder 70 downward when the lower portion of the piston 72 contacts the protrusions 88 (shown in FIG. 5a). In the open-circuit state of FIG. 9, the boot 76 is in the expanded or non-compressed stage because the entire assembly has moved in a downward motion.

The movement that results from use of the manual lever 60 is not entirely vertical because of the rotation of the bracket 80 about the pivot point 120. During this manual operation there will be slight lateral movement of both the assembly 58, adjustment linkage 78, and the rod 20. This lateral movement will not hinder operation of the switches 12 because the rod is made of flexible material, such as wood, fiberglass or the like.

As discussed before in conjunction with FIG. 2, it is possible, though unlikely, that if the cylinder is relieved of pressure unexpectedly while in the closed-switch configuration, gravity acting on the rod 20 and the actuator assembly will cause the switches 12 to open. Normally, the static friction created from the linkage and the connectors 44 will prevent this from occurring. In some applications, the cylinder may be relieved of pressure at all times when the switch position is stationary. This would prevent a continual leakage of the gas source.

Figures 10, 11:
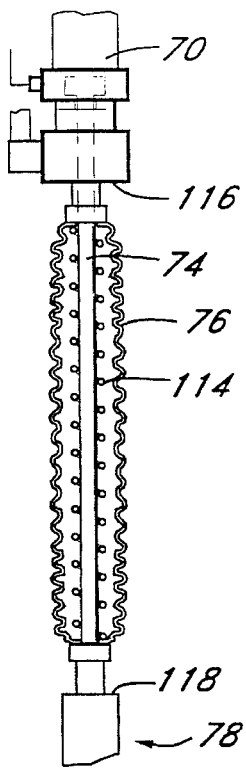
FIG. 10 is an alternative embodiment of the present invention depicting a biasing spring placed around the piston connecting rod.
FIG. 11 is a block diagram of the switch control system.

FIG. 10 shows an alternative embodiment of the poletop switch automation system employing a spring 114 placed around the connecting rod 74. The spring 114 performs the same function as the latching mechanism 13 (shown in FIG. 2), and may be used in place of the latching mechanism. The spring 114 is biased so that when the piston and cylinder assembly is in its furthest upward position, as shown in FIG. 7, the spring exerts an upward force onto the lower end 116 of the cylinder 70 and a downward force on the upper end 118 of the adjustment bracket 78. The force should be large enough to prevent the poletop switches 12 from opening due to gravity, but not large enough to require a significant increase in the pressurized gas needed to open the switches.

Although the static friction created when the poletop switches 12 are in the closed position will not likely be overcome by gravity, the biasing spring 114 provides added insurance of this fact. The biasing spring method and use of a latching mechanism are only two examples of any number of methods which may be advantageously used to prevent the poletop switches 12 from opening should the cylinder 70 be exhausted of the pressurized gas. Another possible method would include using a solenoid operated by the control unit 57 to selectively lock and unlock the system in place during periods of non-movement.

Currently, many electric power poles which contain ganged poletop switches are operated by a manual lever 60 attached directly to a rod 20. The design of the preferred and alternative embodiments, including their collinear adaptability with an existing rod 20, allows for easy modification of an existing manual system to an automated system. This is accomplished by simply cutting away a portion of the rod 20, and substituting therefor, the piston and cylinder assembly 58 and associated linkage. The control unit 57 can then be attached to the power pole and connected to the piston and cylinder assembly 58 to arrive at the configuration shown in FIG. 4. The ability to upgrade an existing power pole unit offers great advantages over anything found in the prior art. In addition, the simplistic design of the present invention keeps costs and operating expenses at a minimal level.

FIG. 11 depicts, in block diagram form, an overall operational layout of the poletop switch automation system in accordance with the preferred embodiment. A power distribution network is typically monitored at a remote control center site 130. When a distant set of poletop switches must be opened or closed, an encoded radio signal is sent via antenna 132 and is received by a corresponding antenna 68 mounted as part of the control unit 57. In a manner well known in the art, a transceiver 134 receives the radio signal and transfers it to a decoder 135 for initial processing and decoding. The decoded signal is then sent to the CPU 136. The preferred embodiment uses a model number NEC-V-25 CPU. The CPU 136 then processes the decoded signal and routes it to the control and monitoring circuitry 138, which in turn activates the solenoid or solenoids, as the case may be, represented by block 140. Activation of the solenoid opens or closes the appropriate gas valve or valves, represented by block 132. This applies pressurized gas to the air cylinder 70, allowing for translational movement of the rod 20 and actuation of the associated poletop switches.

Additionally, status information for the poletop switches may be sent back to the control center 130. This is accomplished when the control and monitoring circuitry 138 receives information from the sensors 90 and 92 (not shown) and transfers this to the CPU. From the CPU 136, this information is encoded by the encoder 137 and then transmitted by the transmitter 134 via the antenna 68.

Figure 12:
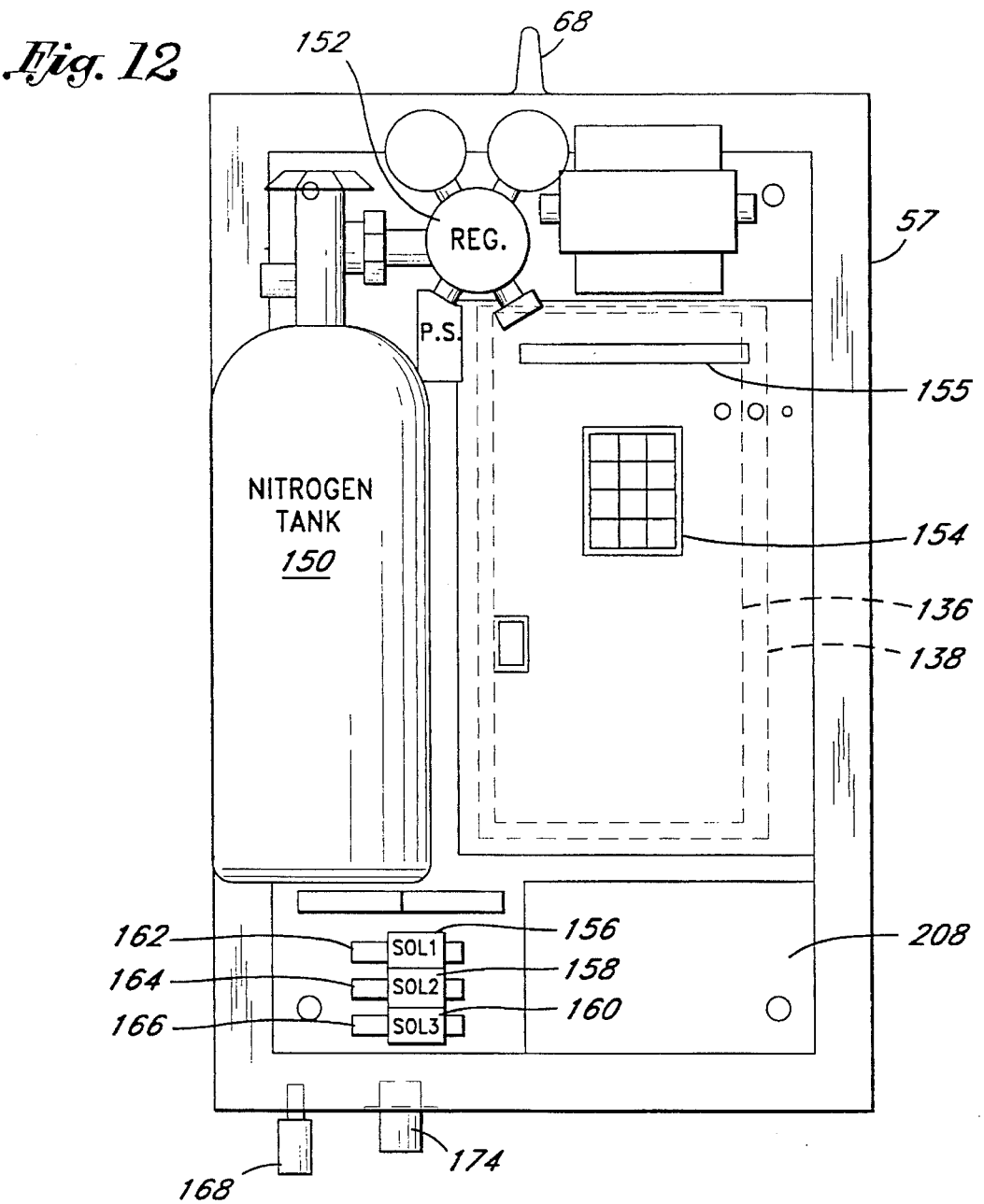
FIG. 12 is a front view of the control unit showing the internal layout of the associated components.

FIG. 12 depicts the control unit 57 and its internal layout of components needed to operate the pneumatic air cylinder 70. As shown, a gas tank 150, filled with nitrogen or other suitable gas, is used to provide a pressurized source of fluid to the air cylinder 70. A regulator 152 is attached to the tank 150 to regulate the pressure transmitted through the air lines 59 and 66, and into the pneumatic cylinder 70. The CPU 136 and the control and monitoring circuitry 138 are placed on circuit boards and mounted in the control unit 57 next to the tank 150 as shown. A keypad 154 and an associated display panel 155 are also mounted in the control unit 57 and are in electrical communication with the CPU. The keypad allows for on-site programming and control of the CPU 136 to open or close the switches 12. A backup battery 208 is placed in the control unit 57 to supply emergency power to the system.

Solenoids 156, 158, and 160, which control the flow of pressurized gas, are mounted in the unit 57 along with the corresponding valves 162, 164, and 166. Gas flowing through the valves 162, 164, and 166 is routed to pneumatic couplers 168 and 170 (see FIG. 13), which are in turn connected to the air lines that run to the cylinder 70 (not shown). The solenoids 156, 158 and 160 are also connected to a separate pneumatic coupling 172 (see FIG. 13), which is used as an exhaust port for expelled gas. Electrical couplings 174 and 176 (see FIG. 13) are provided for attachment of the sensor wires 96 and 98 with the air cylinder 70, and for inputting power to the control unit 57.

Figure 13:
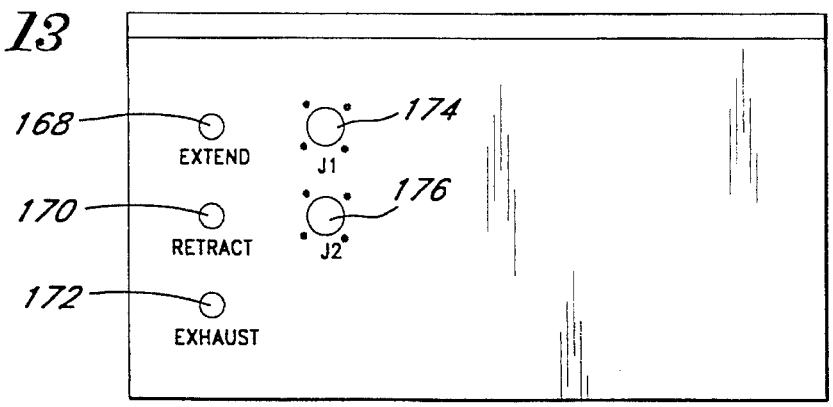
FIG. 13 is a bottom view of the control unit showing the fluid and electrical ports.

FIG. 13 depicts a bottom view of the control unit 57 and the couplings mounted thereon. As previously described, pneumatic couplings 168, 170, 172 transfer the flow of pressurized gas, while electrical coupling 174 is connected to the sensor wires, and electrical coupling 176 is connected to an external power supply.

FIG. 14a shows a schematic diagram of the pneumatic system and the controller for the solenoids. As shown, gas from a pressurized tank 150 is routed through regulator 152 and into an air line 180 which is connected to the valves 162 and 164. The valves 162 and 164 are controlled by solenoids 156 and 158, respectively. Valve 164 is connected through air line 182 to valve 166, and via air line 186, to the pneumatic coupler 168. From the coupler 168, the gas is transmitted through air line 66 to the air cylinder 70. Valve 162 is connected to the air line 184, the pneumatic coupler 170, the air line 59, and finally to an opposite end of the air cylinder 70.

In addition, both valves 162 and 164 are connected through air lines 188 and 190 to the pneumatic coupler 172, and finally to the exhaust port 192. The control circuitry 138 is connected to all three solenoids as shown. When a command is received from the CPU to extend the air cylinder to close the switches 12, appropriate signals are sent to solenoids 158 and 160. Fluid valves 164 and 166 are then opened, while valve 162 is closed, to allow pressurized air to enter the air chamber 86 of cylinder 70. This moves the air cylinder 70 into its furthest upward, or "extend" position, closing the poletop switches 12. Two valves 164 and 166 are used for operation of the extend position to ensure that the air cylinder remains in this position should one of the valves fail. This protection is warranted since the poletop switch automation system will normally be placed in the extend position.

When the air cylinder is to be retracted, appropriate signals are sent to solenoids 158 and 160. In response, the valves 164 and 166 will be adjusted so that pressurized air is released through air lines 188 and out through exhaust port 192. At the same time, solenoid 156 will be activated to open valve 162, allowing pressurized air to travel through air line 184 and into chamber 96 of cylinder 70. When the cylinder 70 is to be again moved from the retracted position to the extended position, valve 162 will be activated to allow pressurized gas to escape from air chamber 96 through lines 184, 188, and 190 out of the exhaust port 192.

FIG. 14b shows a schematic diagram of an alternative embodiment of the pneumatic control system. In the embodiment of FIG. 14b, a single spool valve 185 and associated solenoid 187 is used in place of the three valves and solenoids of FIG. 14a. A model number 35500072 monofunction spool valve and a model number 54000006 solenoid, both made by ASCO Pneumatic Controls, may be used in this configuration. The spool valve 185 is activated by the solenoid 187 to direct the flow of gas to the cylinder in response to an open or close command transmitted by the control circuitry 138. The operation of the valve 185 can best be described in conjunction with FIG. 14c.

FIG. 14c depicts the three position solenoid used to operate the valve 185. The solenoid includes two activating members 191 and 193 which urge a shuttle assembly 195 in a direction along the lines D and E. The position of the solenoid shown in FIG. 14c is an idle position whereby all of the gas lines 180, 184, 186, 188 and 189 are closed. When a command is received by the solenoid 187 to extend the cylinder to close the poletop switches, member 193 is activated urging the shuttle assembly in the direction of the line D. This connects the high pressure line 180 with the gas line 186 and also connects the gas line 184 from the cylinder 70 to the exhaust line 189. Similarly, when a command is received by the solenoid 187 to retract the cylinder 70 to open the poletop switches, member 191 is activated urging the shuttle assembly in the direction of the line E. This movement connects high pressure line 180 with the gas line 184 and also connects the gas line 186 from the cylinder 70 to the exhaust line 188.

Figure 16:
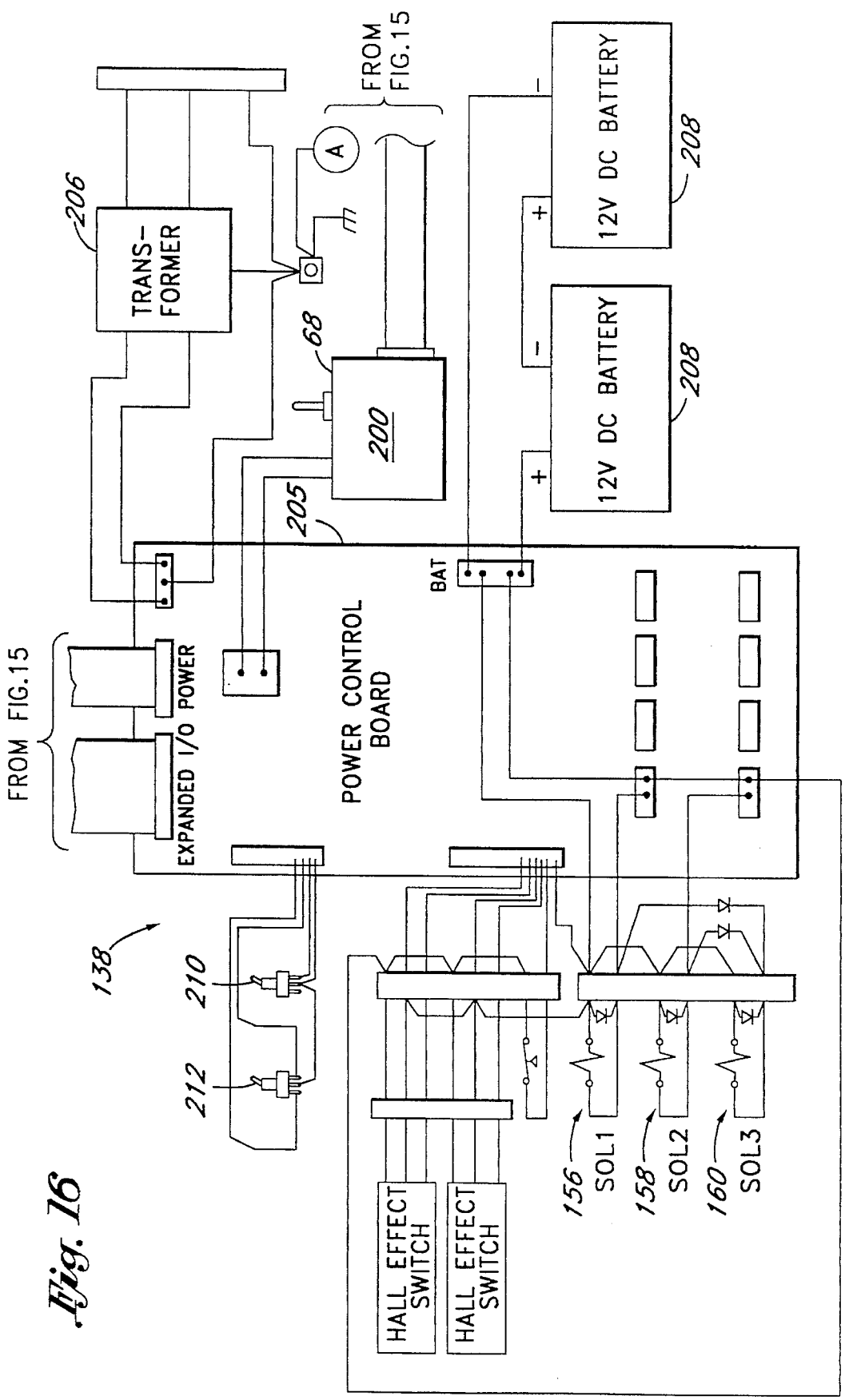

FIGS. 15 and 16 depict a detailed layout of the internal electrical components found in control unit 57. Referring initially to FIG. 16, there is shown a radio unit 200 having an antenna 68 for receiving the radio signals from the control center (not shown). The radio unit 200 is a standard off-the-shelf radio. It is also possible to substitute a modem for the radio for receipt of signals via the telephone lines. A preferred embodiment of the present invention uses a Metricom brand packet radio model number 220C which uses a standard Metricom radio protocol.

Referring now to FIG. 15, the radio signals are transferred to the encoder 135 and to the CPU 136 for processing. Attached to the CPU 136 is the keypad 154 and the status display 155. The functions of the individual keys of the keypad are indicated by the respective key labels. A power cable 202 and an input/output cable 204 run from the CPU 136 to the power control board 205 shown in FIG. 16. The power control board 205 normally receives power from a transformer 206, but has a battery backup capability from battery sources 208.

A first switch 210 attached to the power control board allows the control unit 57 to be switched from auto to manual mode. A second switch 212, which is functional when the switch 210 is in manual mode, allows the pneumatic cylinder to be extended and retracted, depending on the position of the switch 212. Solenoids 156, 158 and 160 are also connected to the power control board 205 for operative response to a radio signal received by the antenna 68. The CPU 136 and control circuitry 138 depicted in FIGS. 15 and 16 are constructed from off-the-shelf items in accordance with known principles. There are various designs and configurations possible for receiving radio commands and operating a set of solenoids as necessary in response to those commands.

Figure 17:
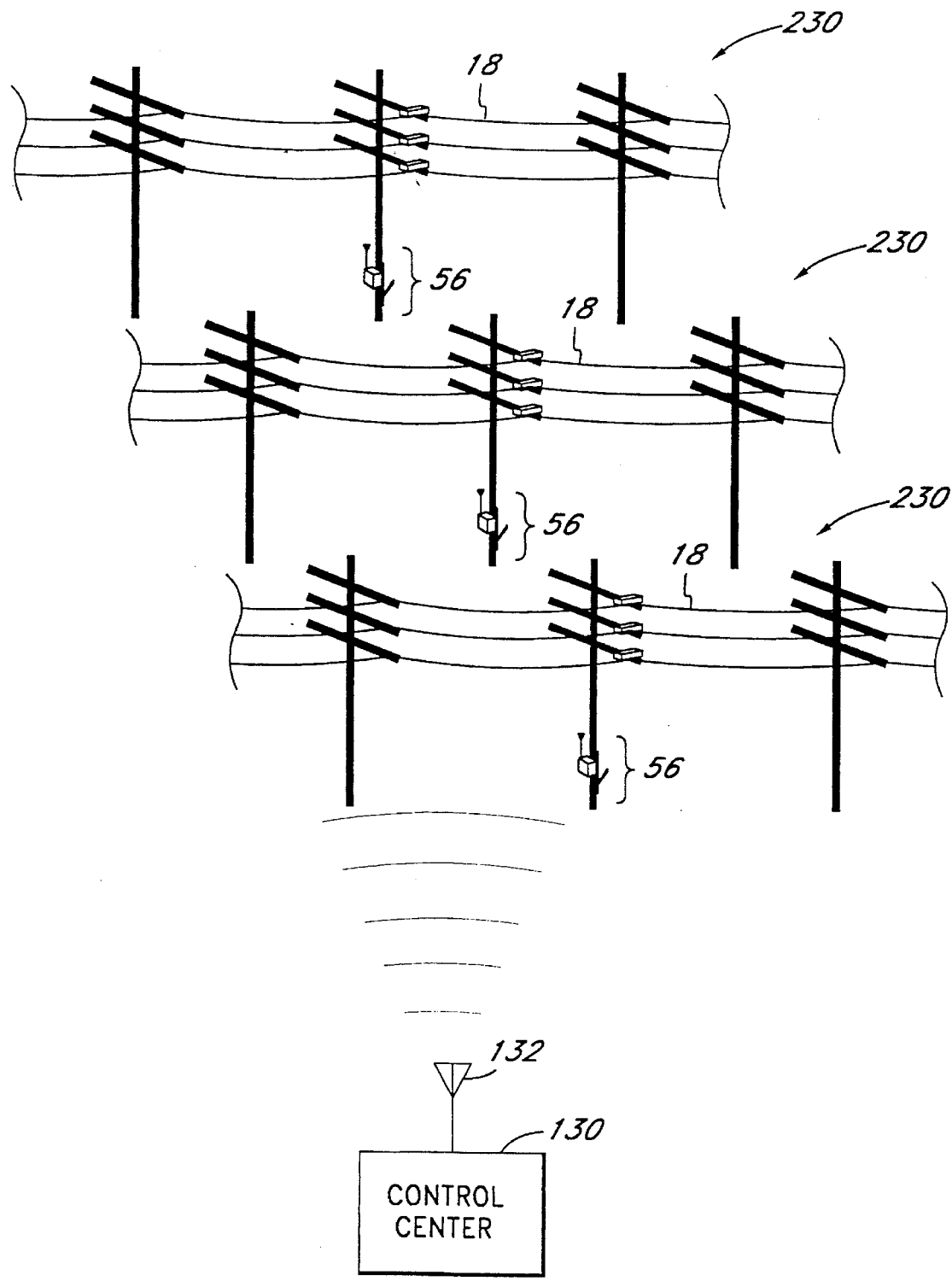
FIG. 17 shows a network of high voltage power lines controlled remotely through the use of poletop switch automation systems as described herein.

Referring now to FIG. 17, there is shown a series of high-voltage electric power poles 230, and corresponding electric power lines 18. Each electric power pole 230 is part of a vast network of electric power poles that make up a broad power distribution system. Poletop switch actuator assemblies 56 are placed on any number of electric power poles, as shown, and are operated collectively on a system wide basis from a control center 130. This setup provides the control center with the ability to selectively and remotely operate a single set of ganged poletop switches, or any combination of ganged poletop switches. Such a system vastly improves a power company's capability to monitor and alter the power distribution highway.

From the preceding description of the preferred embodiments, it is evident that the objects in the invention are obtained. Although the invention has been described and illustrated in detail, it is to be clearly understood that the same is by way of illustration and example only, and is not to be taken by way of limitation. The spirit and scope of the invention are to be limited only by the terms of the appended claims.

I claim:

1. A device for operating a high-voltage switch wherein the switch is mounted to the top of a utility pole and wherein said switch is connected to mechanical linkage extending along the pole and is activated through manipulation of said linkage, said device comprising:

a manually-operable lever having a first end and a second end wherein said first end is rotatably connected to said pole at a pivot point;

a reciprocating assembly having first and second ends, said first end connected to said linkage and said second end connected to said lever at a point spaced from said pivot point such that a force applied in a first direction at said second end of said lever imparts movement of said assembly in said first direction, said assembly having a cylinder and having a reciprocating piston disposed therein for movement of said assembly while said lever is stationary, said movement of said assembly occurring between a first position wherein said reciprocating assembly is a first length and said switch is open, and a second position wherein said reciprocating assembly is a second different length and said switch is closed; and a control unit in operative association with said reciprocating assembly permitting said position of said reciprocating assembly to be monitored and varied by said control unit.

2. The device of claim 1 wherein said reciprocating assembly is pneumatically operated.

3. The device of claim 1 wherein said second end of said lever may be manually actuated to open said switch even when said reciprocating assembly is positioned so that said switch is in said closed position.

4. The device of claim 1 further comprising a position sensor attached to said reciprocating assembly signaling when said switch is in said open position and when said switch is in said closed position.

5. The device of claim 1 wherein said control unit includes a compressed gas tank, a regulator connected to said gas tank for regulating the flow of gas from said tank, a pair of lines providing communication between said tank and said cylinder for transferring gas to said cylinder, a valve to said lines controlling the flow of gas in said air lines, and a radio operated electronic control system controlling said valve in response to signals received from a remote location.

6. The automated device described in claim 1 wherein said reciprocating assembly includes means for manually adjusting the position of said reciprocating assembly relative to said lever.

7. The automated device described in claim 1 wherein said reciprocating movement of said piston relative to said cylinder and said movement of said linkage are collinear.

8. A device for engaging and disengaging a poletop-mounted switch through actuation of linkage connected to said switch and extending axially along said pole, said device comprising:

a cylinder having first and second ends and having a reciprocating piston disposed therein, said piston being positionable between said first and second ends and said linkage connected to said first end of said cylinder, and wherein said switch is engaged when said piston is positioned at said second end of said cylinder and said switch is disengaged when said piston is positioned at said first end of said cylinder;

a connecting rod attached to said piston and extending axially away from said piston and out of said second end of said cylinder;

a lever having a handle end and a pivot end wherein said pivot end is pivotally mounted to said pole below said cylinder and said connecting rod operatively attached to said lever, said lever manually operable to disengage said switch through rotation of said lever about said pivot point when said piston is positioned adjacent said second end of said cylinder;

a position sensor indicating the position of said cylinder relative to said piston; and a remotely-operated control system to operate said switch, said control system varying the relative positions of said piston and said cylinder in response to signals received by said control system.

9. The device of claim 8 further comprising an adjustment apparatus attached between said connecting rod and said lever permitting the position of said piston relative to said lever to be varied.

10. A device for selectively opening and closing high voltage power switches wherein said switches are mounted on an upper end of an electric pole and said device is mounted on a lower end of said pole, and wherein said switches and said device are mechanically connected by an elongated rod, said device comprising:

a piston and cylinder assembly having an upper end and a lower end, wherein said cylinder is formed with an interior chamber for receiving said piston and allowing translational movement therein by said piston, said piston dividing said interior chamber into an upper chamber and a lower chamber, said upper end of said assembly attached to said rod; and a control system connected to said piston and cylinder assembly, said control system operative to receive signals and direct fluid to said cylinder in response to said signals to actuate said assembly; and a manually operable override controller operably coupled to said rod to open said switches in response to a force applied to said manually operable override controller.

11. The device of claim 10 further comprising an adjustment bracket connected to said lower end of said assembly permitting movement of the position of said piston and cylinder assembly, said adjustment bracket adapted to be mounted to said pole, wherein said adjustment bracket, said assembly, and said rod are linearly aligned;

12. The device of claim 10 wherein said actuation of said assembly is a translatable movement resulting in a substantially identical translatable movement of said rod.

13. The device of claim 10 wherein said control system contains a central processing unit and at least one electronic solenoid operating a corresponding fluid valve, wherein said central processing unit activates said solenoid in response to said signals.

14. The device of claim 13 wherein said signals include an open signal and a close signal, and wherein said solenoid is activated to direct pressurized gas to said upper chamber of said cylinder in response to said close signal, and said solenoid is activated to direct pressurized gas to said lower chamber in response to said open signal.

15. The device of claim 13 wherein said signals are radio signals transmitted through the air.

16. The device of claim 10 wherein said lower end of said assembly comprises a connecting rod attached to said piston and extending out of said cylinder.

17. The device of claim 10 wherein said piston and cylinder assembly further comprises a biasing spring preventing said switches from inadvertently opening if said cylinder is exhausted of pressurized gas.

18. The device of claim 10 further comprising means for sensing the position of said cylinder relative to said piston, and means for transmitting the position information to said control system and to said control center.

19. The device of claim 18 wherein said sensing means is a magnetically sensitive transducer attached to said cylinder and said transmitting means is a wire attached to said transducer and to said control system.

20. The device of claim 10 wherein said manual operable controller permits manual operation of said device to open said switches when said control system receives a signal to close said switches.

21. The device described in claim 20 wherein said manually operable controller comprises a rotatably mounted lever.

22. A system capable of opening and closing high voltage power switches wherein said switches are mounted on an upper end of an electric pole and wherein said switches are operatively connected by an elongated rod to a lever attached to a lower end of said pole, said system comprising:

an in-line actuator having a first end and a second end wherein said actuator is adapted to be positioned at said lower end of said pole between said rod and said lever, said actuator adapted for connection to said elongated rod at said first end, and adapted for connection to said lever at said second end, said actuator positioned linearly with said elongated rod and providing translatable movement of said rod to open and close said switches in response to translatable movement of said actuator; and a controller attached to said pole and in communication with said actuator, said controller containing a receiver to receive a signal, a processor to process said signal, and an apparatus responsive to said processed signal to vary the direction of translatable movement by said actuator.

23. The system of claim 22 wherein said actuator further comprises a sensor detecting the position of said actuator and wherein said controller further comprises a transmitter, said sensor in communication with said controller providing actuator positional information to said controller and said transmitter capable of forwarding said information to a switch monitoring center.

24. The system of claim 23 wherein said controller forwards said information to said switch monitoring center in response to an inquiry by said switch monitoring center regarding said switches.

25. The system of claim 22 wherein said actuator includes an adjustment bracket positioned between said lever and said rod permitting translatable movement of said actuator in response to a torque applied to said adjustment bracket.

26. A method of converting an existing manually operated set of electric poletop switches attached to an electric power pole wherein said poletop switches are mechanically attached to a distal operating lever by a rod running therebetween, to an automated system for actuating said poletop switches in response to an electronic command comprises the following steps:

providing a translatable cylinder assembly capable of movement between two positions in response to the flow of fluid, said flow of fluid controlled by a remote receiving and processing unit;

removing a section of said rod near said operating lever;

substituting said cylinder assembly for said section of said removed rod so that said assembly is linearly aligned with said rod;

securing one end of said cylinder assembly to said rod and securing an opposite end of said cylinder assembly to said operating lever permitting said poletop switches to be manually opened in response to movement of said operating lever; and mounting said remote receiving and processing unit to said power pole in a position for operative association with said cylinder assembly.

27. The method described in claim 26 wherein said cylinder assembly comprises an adjustment bracket for manually positioning said assembly, and said method further comprising the steps of:

manually adjusting said adjustment bracket to align said movement of said cylinder assembly with said operation of said poletop switches;

applying a source of power to said control system to energize said system to operate said solenoids in response to receipt of said electronic command.

28. A system for operating a high-voltage power switch wherein said switch is mounted to a top end of a utility power pole and movement of said switch is controlled through actuating linkage extending along the length of said pole towards the ground, said system comprising:

an automated controller positioned toward the bottom of said pole and connected to said linkage, said controller capable of movement between a first position to close said switch and a second position to open said switch;

a manual controller connected to said automated controller and capable of movement between a first position to close said switch and a second position to open said switch; and wherein said switch is open when one of said automated or said manual controllers is in said respective second position even if said other of said automated or manual controllers is in said respective first position.

\* \* \* \* \*